(12) United States Patent
Albero et al.

(10) Patent No.: US 11,797,574 B2
(45) Date of Patent: Oct. 24, 2023

(54) HIERARCHIC DISTRIBUTED LEDGER FOR DATA LINEAGE

(71) Applicant: Bank of America Corporation, Charlotte, NC (US)

(72) Inventors: George Albero, Charlotte, NC (US); Maharaj Mukherjee, Poughkeepsie, NY (US)

(73) Assignee: Bank of America Corporation, Charlotte, NC (US)

( * ) Notice: Subject to any disclaimer, the term of this patent is extended or adjusted under 35 U.S.C. 154(b) by 182 days.

(21) Appl. No.: 17/389,739

(22) Filed: Jul. 30, 2021

(65) Prior Publication Data
US 2023/0032597 A1    Feb. 2, 2023

(51) Int. Cl.
*G06F 16/00* (2019.01)
*G06F 16/28* (2019.01)
*G06F 16/22* (2019.01)
*G06F 16/23* (2019.01)

(52) U.S. Cl.
CPC ........ *G06F 16/282* (2019.01); *G06F 16/2282* (2019.01); *G06F 16/23* (2019.01)

(58) Field of Classification Search
CPC .... G06F 16/282; G06F 16/2282; G06F 16/23; G06F 16/27; G06F 16/9024; G06F 21/64; H04L 9/05
See application file for complete search history.

(56) References Cited

U.S. PATENT DOCUMENTS

| | | |
|---|---|---|
| 9,317,575 B1 | 4/2016 | Meran et al. |
| 10,210,240 B2 | 2/2019 | Vasisht et al. |
| 10,313,177 B2 | 6/2019 | Radivojevic et al. |
| 10,459,954 B1 | 10/2019 | Walters et al. |
| 10,503,905 B1 * | 12/2019 | Misra ........................ G06F 21/64 |
| 10,602,202 B1 | 3/2020 | Taylor et al. |
| 10,637,669 B2 | 4/2020 | Johnson et al. |
| 10,671,629 B1 | 6/2020 | Richt et al. |
| 10,691,714 B1 | 6/2020 | Richt et al. |
| 10,705,877 B2 | 7/2020 | Wolfson et al. |
| 10,769,165 B2 | 9/2020 | Simon et al. |
| 10,776,740 B2 | 9/2020 | Halberstadt et al. |
| 10,824,751 B1 | 11/2020 | Kurian |
| 10,841,628 B1 | 11/2020 | Taylor et al. |
| 10,902,333 B2 | 1/2021 | Lee et al. |
| 10,915,545 B2 | 2/2021 | Vankamamidi et al. |
| 10,917,283 B2 | 2/2021 | Radivojevic et al. |
| 10,929,389 B2 | 2/2021 | Wolfson et al. |
| 10,951,790 B1 | 3/2021 | Sardesai et al. |

(Continued)

*Primary Examiner* — Dinku W Gebresenbet
(74) *Attorney, Agent, or Firm* — Banner & Witcoff, Ltd.

(57) ABSTRACT

A computing platform may generate a distributed ledger including a plurality of hierarchic element chains, where: 1) data lineage is generated, for each element of each hierarchic element chain at a speed that matches a speed of data entry to the corresponding hierarchic element chain, and 2) at least a first hierarchic element chain is configured to operate at a first speed and at least a second hierarchic element chain is configured to operate at a second speed, slower than the first speed. The computing platform may receive a request to access the data lineage. The computing platform may send one or more commands directing a computing device to display the data lineage, which may cause the computing device to display the data lineage.

18 Claims, 9 Drawing Sheets

(56) References Cited

U.S. PATENT DOCUMENTS

| | | |
|---|---|---|
| 11,030,805 B2 | 6/2021 | Gordon et al. |
| 11,037,170 B2 | 6/2021 | Malkin |
| 11,075,747 B1 | 7/2021 | Holsman |
| 2019/0207750 A1* | 7/2019 | Harvey ................ H04L 9/0643 |
| 2020/0204352 A1* | 6/2020 | Thompson ............ H04L 9/3247 |

* cited by examiner

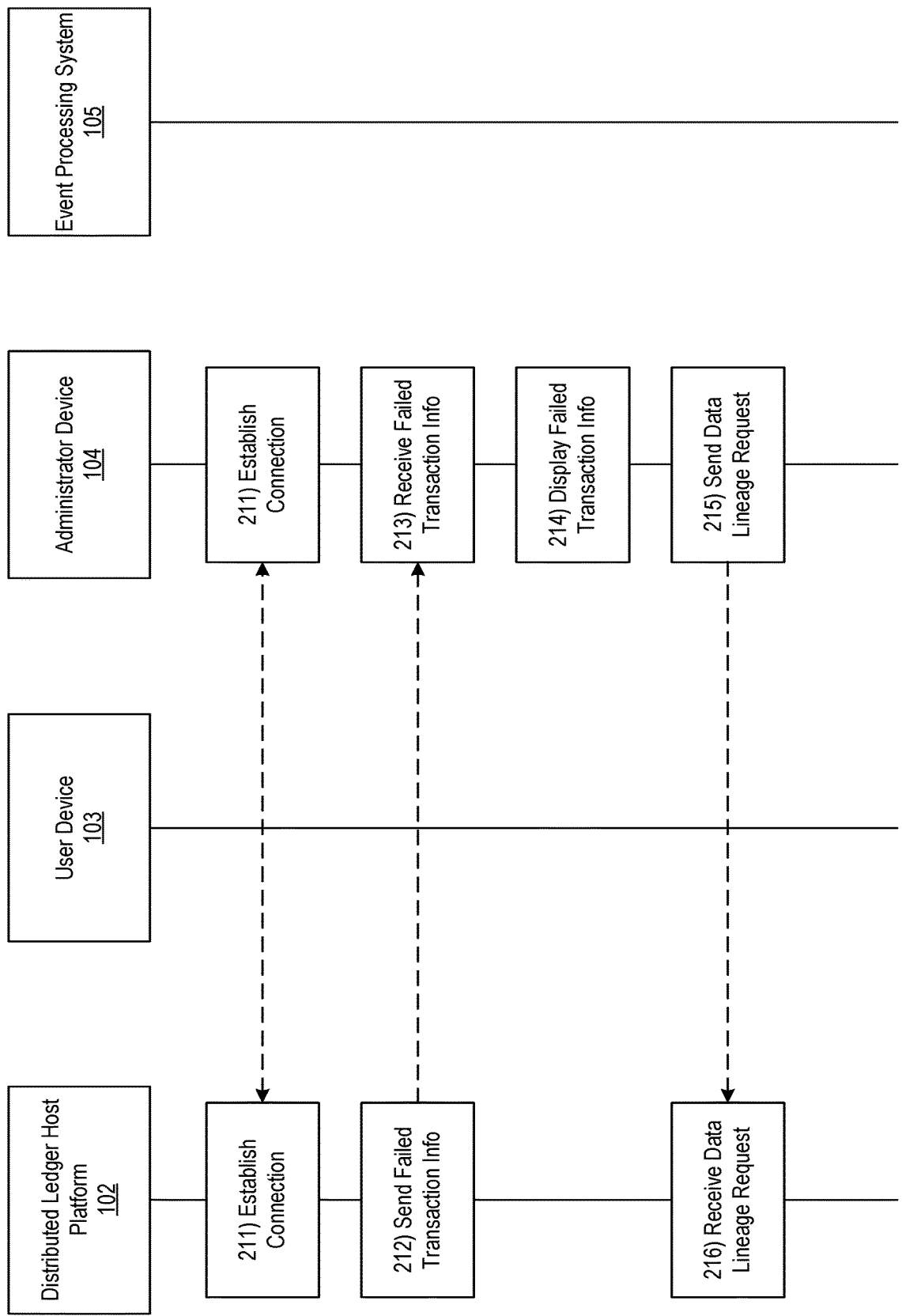

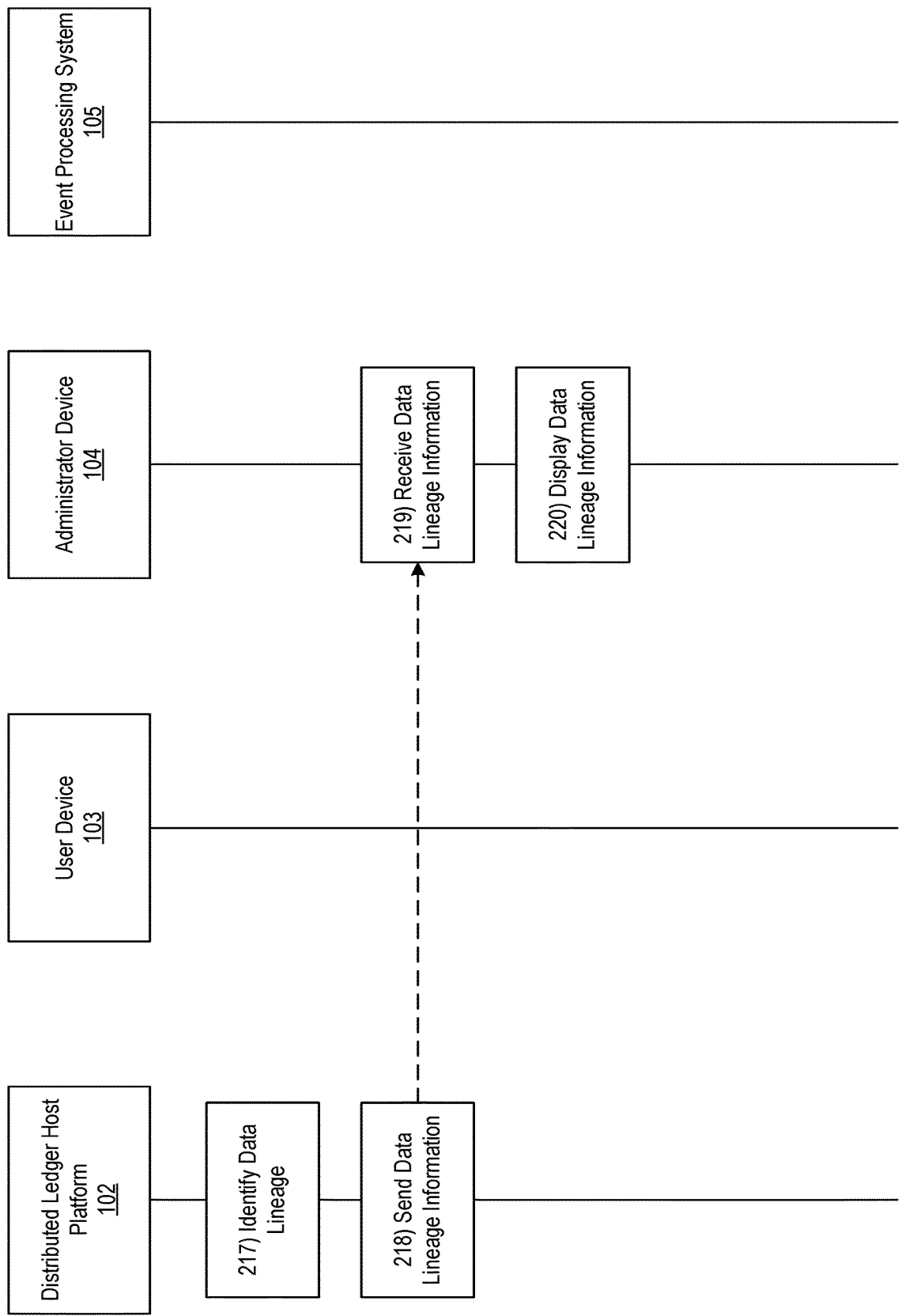

Failed Transaction Notification

405

Please note that the identified transaction was unable to be validated by the distributed ledger. Please review and/or take action accordingly.

FIG. 4

Data Lineage Interface

505

Data lineage information for the requested transaction is shown below:

Origin information...
Movement information...
Characteristic information...
Quality information...

FIG. 5

HIERARCHIC DISTRIBUTED LEDGER FOR DATA LINEAGE

BACKGROUND

Aspects of the disclosure relate to distributed ledgers. In some cases, distributed ledgers may be used for data validation. In some instances, however, there may be delays in processing and/or data lineage generation due to a number of data elements and/or parties involved in the distributed ledgers. As a result, in distributed ledger systems, data lineage might not reflect a current state of data, thus reducing the appeal of using such distributed ledger systems and therefore not achieving the technical benefits of such distributed ledger systems.

SUMMARY

Aspects of the disclosure provide effective, efficient, scalable, and convenient technical solutions that address and overcome the technical problems associated with distributed ledgers. In accordance with one or more embodiments of the disclosure, a computing platform comprising at least one processor, a communication interface, and memory storing computer-readable instructions may generate a distributed ledger, which may include generating a plurality of hierarchic element chains, where: 1) data lineage may be generated, for each element of each hierarchic element chain at a speed that matches a speed of data entry to the corresponding hierarchic element chain, and 2) at least a first hierarchic element chain may be configured to operate at a first speed and at least a second hierarchic element chain may be configured to operate at a second speed, slower than the first speed. The computing platform may receive a request to access the data lineage. The computing platform may send one or more commands directing a computing device to display the data lineage, which may cause the computing device to display the data lineage.

In one or more instances, generating the plurality of hierarchic element chains may include: 1) generating one or more first hierarchic element chains, each corresponding to a data element in a data table; 2) generating one or more second hierarchic element chains, each corresponding to one or more of: a row or a column of the data table; 3) generating one or more third hierarchic element chains, each corresponding to the data table; 4) generating one or more fourth hierarchic element chains, each corresponding to a database that includes one or more tables, wherein the one more tables includes the data table; and 5) generating one or more fifth hierarchic element chains, each corresponding to a database set that includes one or more databases including the database.

In one or more examples, generating the one or more second hierarchic element chains may include generating a first block representative of the one or more first hierarchic element chains. In one or more instances, the computing platform may update the second hierarchic element chain, which may include: 1) identifying a number of modifications to the one or more first hierarchic element chains, 2) comparing the number of modifications to a modification threshold, 3) identifying that the number of modifications exceeds the modification threshold, and 4) based on identifying that the number of modifications exceeds the modification threshold: a) hashing a first block of the second hierarchic element chain, and b) adding a second block to the second hierarchic element chain that includes the hash of the first block and indicates the modifications.

In one or more instances, the computing platform may update the second hierarchic element chain, which may include: 1) identifying an amount of time that has elapsed since creation of a current block of the second hierarchic element chain, 2) comparing the amount of time to a modification threshold, 3) identifying that the amount of time exceeds the modification threshold, 4) based on identifying that the amount of time exceeds the modification threshold: a) hashing the current block of the second hierarchic element chain, and b) adding a second block to the second hierarchic element chain that includes the hash of the current block and indicates modifications to the one or more first hierarchic element chains.

In one or more examples, access permissions for each level of the hierarchic element chains may be different. In one or more examples, the computing platform may identify that the second speed is slower than the speed of data entry in the second hierarchic element chain. Based on identifying that the second speed is slower than the speed of data entry in the second hierarchic element chain, the computing platform may insert a hierarchic element chain between the first hierarchic element chain and the second hierarchic element chain, where adding the hierarchic element chain may cause the second speed to reduce to the speed of data entry in the second hierarchic element chain.

In one or more instances, the computing platform may identify that the second speed is slower than the speed of data entry in the second hierarchic element chain. Based on identifying that the second speed is slower than the speed of data entry in the second hierarchic element chain, the computing platform may remove a hierarchic element chain from between the first hierarchic element chain and the second hierarchic element chain, where removing the hierarchic element chain may cause the second speed to increase to the speed of data entry in the second hierarchic element chain.

In one or more examples, the computing platform may identify multiple data lineage paths for a current element of the first hierarchic element chain. The computing platform may generate, based on identifying the multiple data lineage paths, a fork in the first hierarchic element chain, resulting in two current elements for the first hierarchic element chain.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for implementing a hierarchic blockchain for data lineage in accordance with one or more example embodiments;

FIGS. 4 and 5 depict illustrative graphical user interfaces for implementing a hierarchic blockchain for data lineage in accordance with one or more example embodiments.

DETAILED DESCRIPTION

Figure 1A:
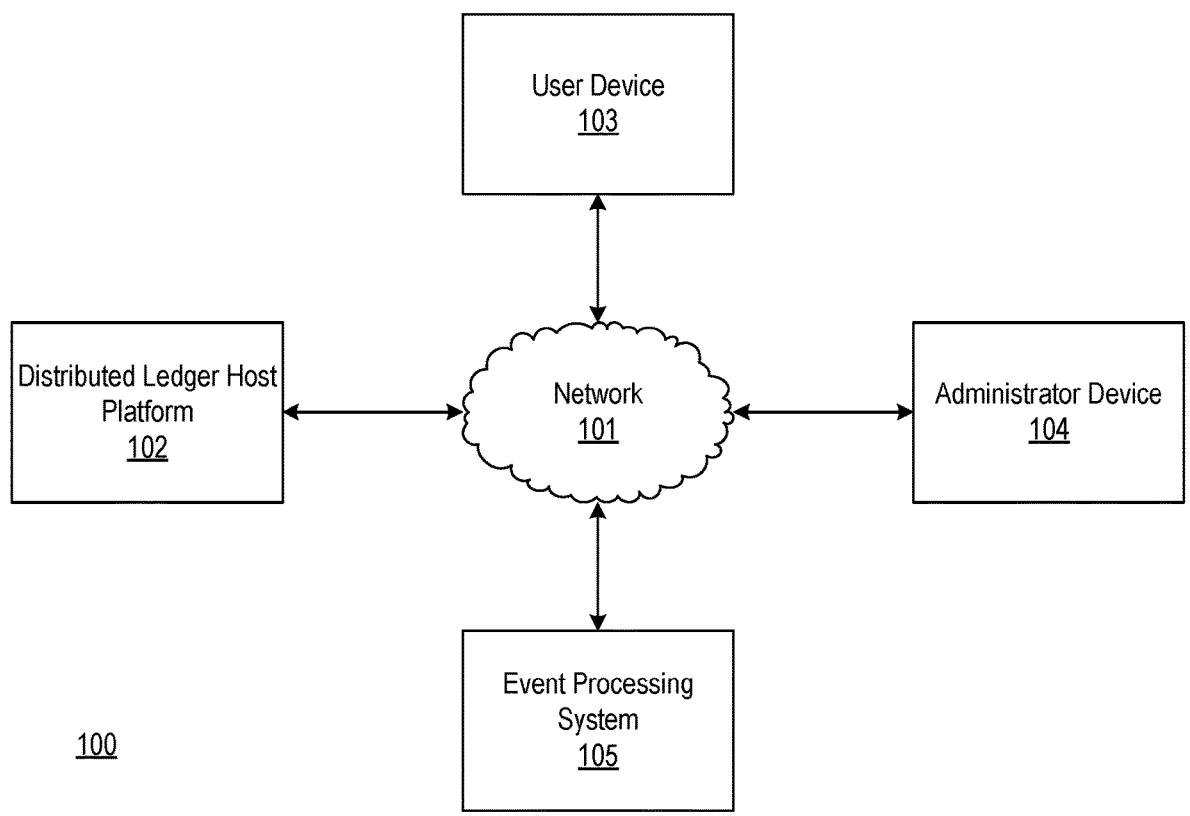
FIGS. 1A-1B depict an illustrative computing environment for implementing a hierarchic blockchain for data lineage in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to using a hierarchic blockchain for data lineage. For example, data lineage refers to a journey that data takes after creation and including transformations over time. It may describe a certain dataset's origin, movement, characteristics, quality, and/or other information.

Data lineage may be important to organizations for a number of reasons. For example, data lineage may have a business impact, and may be crucial to every organization's survival. Accordingly, it may be important for businesses to think about the flow of data across multiple systems that fuels organizational decision-making.

In addition, data lineage may be important for compliance and/or auditability. For example, business terms and data policies may be implemented through standardized and documented business rules. Compliance with these business rules may be tracked through data lineage, incorporating auditability and validation controls across data transformations and pipelines to generate alerts when there are non-compliant data instances.

Furthermore, data lineage may be important for data governance. For example, an automated data lineage solution may stich together metadata for understanding and validating data usage, as well as mitigating the associated risks. It may auto-document end-to-end upstream and downstream data lineage, revealing any changes that have been made, by who, and when.

Additionally, data lineage may be important for collaboration. For example, analytics and reporting may be data-dependent, making collaboration among different business groups and/or departments crucial.

Moreover, data lineage may be important for data quality. Data quality may be affected by data movement, transformation, interpretation, and/or selection throughout people, process, and/or technology. Root-cause analysis may be the first step in repairing data quality. Once a data steward determines where a data flaw was introduced, the reason for the error may be determined. With data lineage and mapping, the data steward may trace the information flow backward to examine the standardizations and transformations applied to confirm whether they were performed correctly.

There may be several technical problems currently associated with data lineage methodologies. First, tracing a source/pathway of data may be an arduous task. Additionally, many large organizations, in their desire to modernize with technology, may have acquired several different systems with various data entry points and transformation rules for data as it moves into and across the organization. Further, these tools may be disparate and disjointed, and thus tacking data lineage through different tolls may be difficult. In addition, data lineage may be recorded after the fact, and might not reflect the current state of data. Accordingly, there is a need for a single, efficient system for maintaining the data lineage that is easy to handle and maintains the integrity of the record. Accordingly, a hierarchic blockchain-based method for maintaining data lineage is described herein that is efficient, fast, and secure.

Although there are numerous advantages to using blockchain for data lineage, no practical solution exists for at least the following reasons. First, the speed of any blockchain might not keep up with the speed requirements of data creation and transformation. For example, the speed of some of the well-known blockchains may run in multiple seconds, whereas data creation and transformation may be performed in terms of milliseconds. Second, single blockchain models may have a large number of stake holders, which may make data validation more expensive (which may e.g., add further to inefficiency and complexity of implementation). Third, alerts/notifications might not be created if data has been changed and communicated to only the stake-holders that it concerns. Accordingly, described herein is a hierarchic blockchain based method for maintaining data lineage that solves the speed issue by creating multiple blockchains at different levels of data with different speeds. It also solves the problem of having too many stakeholders by providing data access at different levels and creating alerts/notifications only for the selected stake holders.

Accordingly, described herein is a hierarchic blockchain that uses blockchains at different levels of data starting with a data warehouse or a data lake on the top—with multiple databases all the way to a blockchain maintaining the data lineage of a single data element—with hierarchic blockchains in between for a single row or column, at a single table, a database with a given schema, and/or other data elements. In some instances, there may be several blockchains in between to accommodate the speed of data at that level. Any time data is created or transformed, an entry may be created at the lowest level of the data hierarchy. The data entry may be validated by the stakeholder at the lowest level and entered in the corresponding blockchain as an indelible entry. Any valid entry at a lower level of the blockchain may create a valid entry at the corresponding upper level of the blockchain hierarchy and validated by the corresponding stakeholders and moved up the chain of hierarchy. In some instances, data entities may be replicated to another database or another table, and a blockchain may be forked to represent the scenario.

As a result, a system and method for a hierarchic blockchain-based method for maintaining data lineage is described that is efficient, fast, and secure. This method solves the speed issue by creating multiple blockchains at different levels of data with different speeds, solves the problem of too many stake holders by providing data access at different levels, and allows the blockchain to fork when data creates a different data lineage.

These and other features are described in further detail below.

Figure 1B:
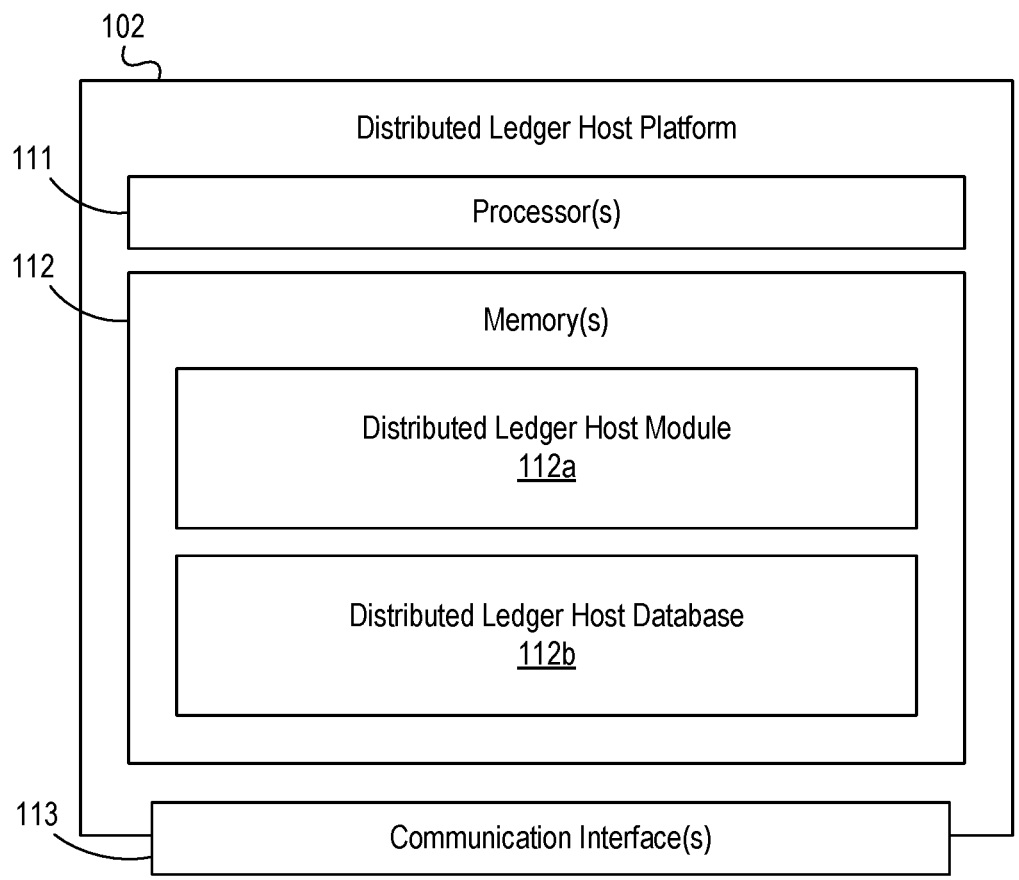

FIGS. 1A-1B depict an illustrative computing environment that implements a hierarchic blockchain for data lineage in accordance with one or more example embodiments. Referring to FIG. 1A, computing environment 100 may include one or more computer systems. For example, computing environment 100 may include a distributed ledger host platform 102, user device 103, administrator device 104, and an event processing system 105.

As described further below, distributed ledger host platform 102 may be a computer system that includes one or more computing devices (e.g., servers, server blades, or the like) and/or other computer components (e.g., processors, memories, communication interfaces) that may be used to generate, host, and/or otherwise maintain a multi-layer distributed ledger (e.g., blockchain), which may subsequently be used to provide data lineage information.

User device 103 may be a laptop computer, desktop computer, mobile device, tablet, smartphone, and/or other device that may be used by an individual to request processing of an event (e.g., a transaction, electronic trade, fund transfer, apply for a mortgage or other loan, and/or other event). In some instances, user device 103 may be configured to display one or more user interfaces (e.g., event processing interfaces, or the like).

Administrator device 104 may be a laptop computer, desktop computer, mobile device, tablet, smartphone, and/or other device that may be used to maintain, manage, and/or otherwise receive information from the distributed ledger. In some instances, administrator device 104 may be configured to display one or more user interfaces (e.g., interfaces that identify data lineage and/or other information from the distributed ledger). In some instances, the administrator device 104 may be controlled or otherwise managed by an enterprise organization (e.g., a financial institution) and/or a regulatory authority (for example, there may be multiple administrator devices 104). For example, the administrator device 104 may be used to identify compliance with a regulatory authority, perform audits, perform data governance and management, provide data/business insights, distinguish between data sources (e.g., external, internal, hybrid), perform root cause analysis in instances of a data breach or security incident, and/or perform other functions.

Event processing system 105 may be or include one or more computing devices (servers, server blades, or the like) configured to process one or more events (e.g., transactions, trades, fund transfers, exchanges, and/or other events). For example, the event processing system 105 may be maintained or otherwise managed by a financial institution, and may be configured to process events after receiving an indication that the events have been validated by the distributed ledger.

Computing environment 100 also may include one or more networks, which may interconnect distributed ledger host platform 102, user device 103, administrator device 104, and/or event processing system 105. For example, computing environment 100 may include a network 101 (which may interconnect, e.g., distributed ledger host platform 102, user device 103, administrator device 104, and/or event processing system 105).

In one or more arrangements, distributed ledger host platform 102, user device 103, administrator device 104, and/or event processing system 105 may be any type of computing device capable of sending and/or receiving requests and processing the requests accordingly. For example, distributed ledger host platform 102, user device 103, administrator device 104, event processing system 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of distributed ledger host platform 102, user device 103, administrator device 104, and/or event processing system 105 may, in some instances, be special-purpose computing devices configured to perform specific functions.

Referring to FIG. 1B, distributed ledger host platform 102 may include one or more processors 111, memory 112, and communication interface 113. A data bus may interconnect processor 111, memory 112, and communication interface 113. Communication interface 113 may be a network interface configured to support communication between distributed ledger host platform 102 and one or more networks (e.g., network 101, or the like). Memory 112 may include one or more program modules having instructions that when executed by processor 111 cause distributed ledger host platform 102 to perform one or more functions described herein and/or one or more databases that may store and/or otherwise maintain information which may be used by such program modules and/or processor 111. In some instances, the one or more program modules and/or databases may be stored by and/or maintained in different memory units of distributed ledger host platform 102 and/or by different computing devices that may form and/or otherwise make up distributed ledger host platform 102. For example, memory 112 may have, host, store, and/or include distributed ledger host module 112a and/or distributed ledger host database 112b.

Distributed ledger host module 112a may have instructions that direct and/or cause distributed ledger host platform 102 to generate and maintain a hierarchic distributed ledger for data lineage, as discussed in greater detail below. Distributed ledger host database 112b may store information used by distributed ledger host module 112a and/or distributed ledger host platform 102 in application of advanced techniques to generate and maintain a hierarchic distributed ledger for data lineage, and/or in performing other functions.

Figure 2A:
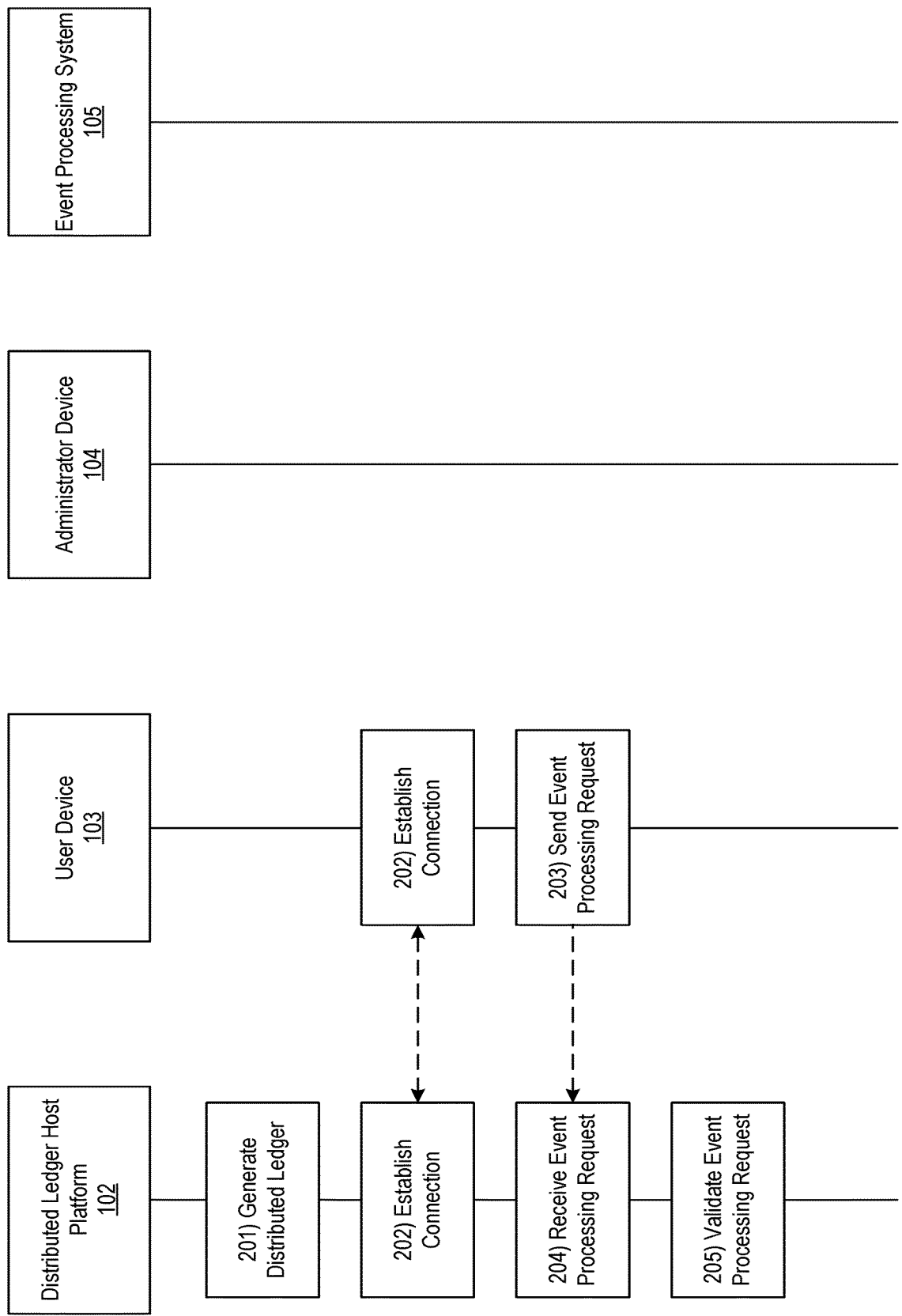
Figure 6:
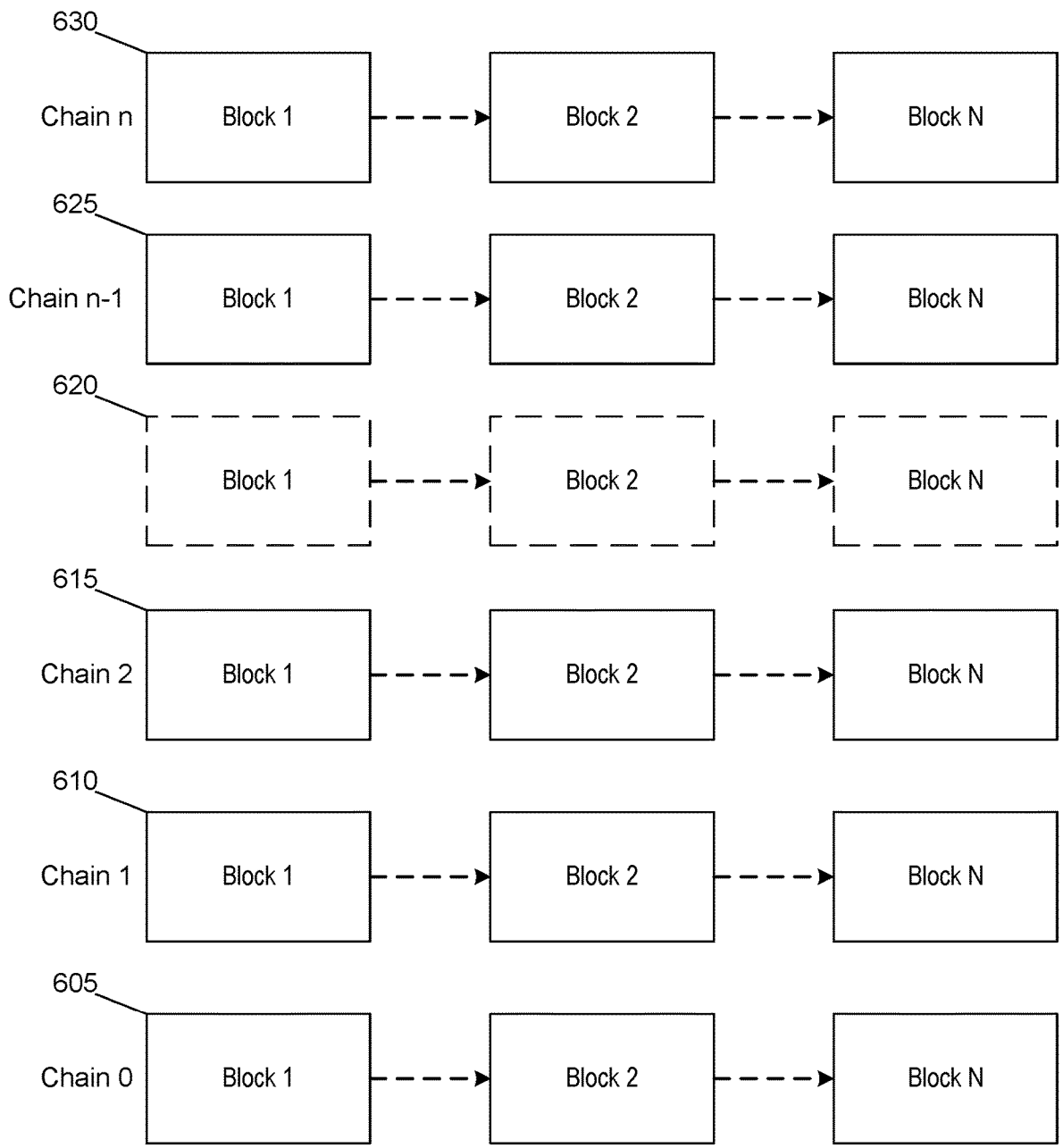
FIG. 6 depicts an illustrative hierarchical distributed blockchain for identifying data lineage in accordance with one or more example embodiments.

FIGS. 2A-2D depict an illustrative event sequence for implementing a hierarchic blockchain for data lineage in accordance with one or more example embodiments. Referring to FIG. 2A, at step 201, the distributed ledger host platform 102 may generate a distributed ledger. For example, the distributed ledger host platform 102 may generate and/or otherwise establish a plurality of hierarchical blockchains that may be used to store and validate event processing information (e.g., requests to execute a trade, transaction, transfer, and/or perform other event), records, and/or other information. For example, the distributed ledger host platform 102 may generate a hierarchical blockchain similar to the chain illustrated in FIG. 6.

By way of example, the distributed ledger host platform 102 may generate one or more chain 0's (e.g., blockchain 605), in which block 1 may represent a single data element (e.g., a particular data point from a data table). If the information in a chain 0 block 1 is modified, the previous block (e.g., chain 0 block 1) may be hashed, and a new block (e.g., chain 0 block 2) may be generated. Although a single blockchain 605 is shown, this is for illustrative purposes only, and any number of blockchains 605 may be included in the hierarchical distributed ledger without departing from the scope of the disclosure. For example, a blockchain 605 may be generated for each available data element. In some instances, the speed at which data lineage (e.g., metadata indicating where data was created, who created it, modifications to the data, who accessed the data, where data is being accessed from, and/or other information) is generated for the blockchain 605 may match the speed of block creation for the blockchain 605. This process of new block creation may continue through chain 0 block N.

Similarly, the distributed ledger host platform 102 may generate one or more chain 1's (e.g., blockchain 610), in which block 1 may represent, for example, a row or column of data elements. For example, block 1 of chain 1 may represent a plurality of block 1's from chain 0. If information changes in a number of block 1's for chain 0 that exceeds a predetermined threshold, block 1 of chain 1 may be hashed and updated to produce block 2 of chain 1. Additionally or alternatively, block 1 of chain 1 may be hashed and updated to produce block 2 of chain 1 upon expiration of a predetermined time interval. Although a single blockchain 610 is shown, this is for illustrative purposes only, and any number of blockchains 610 may be included in the hierarchical distributed ledger without departing from the scope of the disclosure. For example, a blockchain 610 may be generated for each available row or column of data elements. In some instances, the speed at which data lineage is generated for the blockchain 610 may match the speed of block creation for the blockchain 610, which may be slower than the speed of block creation for the blockchain 605. This process of new block creation may continue through chain 1 block N.

In addition, the distributed ledger host platform 102 may generate one or more chain 2's (e.g., blockchain 615), in which block 1 may represent, for example, a table of data elements. For example, block 1 of chain 2 may represent a plurality of block 1's from chain 1. If a number of block 1's for chain 1 experience information changes, and that number exceeds the predetermined threshold, block 1 of chain 2 may be hashed and updated to produce block 2 of chain 2. Additionally or alternatively, block 1 of chain 2 may be hashed and updated to produce block 2 of chain 2 upon expiration of a predetermined time interval. Although a single blockchain 615 is shown, this is for illustrative purposes only, and any number of blockchains 615 may be included in the hierarchical distributed ledger without departing from the scope of the disclosure. For example, a blockchain 615 may be generated for each available data table. In some instances, the speed at which data lineage is generated for the blockchain 615 may match the speed of block creation for the blockchain 615, which may be slower than the speed of block creation for the blockchain 605 and blockchain 610. This process of new block creation may continue through chain 2 block N.

Accordingly, any number N of blockchains may be produced to generate the hierarchical distributed ledger (e.g., blockchains 625 and 630 may be produced in a similar manner as described above with regard to blockchains 605, 610, and 615, and may have slower speeds going up the hierarchy). For example, blockchain 630 may have a slower speed than blockchain 625, which may have a slower speed than blockchain 615. In these examples, blockchain 625 may represent, for example, a single database with multiple tables, and blockchain 630 may represent multiple databases. As described above with regard to the remaining blockchains, there may be any number of blockchains 625 and 630 without departing from the scope of the disclosure, and new blocks may be added to the blockchains using the methods described above. Similarly, speeds at which data lineage is generated for these blockchains may match the speeds of block creation.

In some instances, the distributed ledger host platform 102 may identify that a speed of data lineage for one or more blockchains does not match the speed of block creation for the corresponding chain. For example, the distributed ledger host platform 102 may identify that the speed is too high. In these examples, an intervening blockchain may be added to the hierarchical distributed ledger (e.g., between the blockchain that is moving too fast and the chain beneath it). In doing so, the distributed ledger host platform 102 may reduce the speed of block creation and/or data lineage. This is illustrated, for example, by the insertion of blockchain 620 between blockchain 615 and 625. In other examples, the distributed ledger host platform 102 may identify that the speed is too low. In these instances, an intervening blockchain may be removed (e.g., between the blockchain that is moving too slow and the chain beneath it). In doing so, the distributed ledger host platform 102 may increase the speed of block creation and/or data lineage. For example, blockchain 620 may be removed from the hierarchical distributed ledger.

By generating the hierarchic distributed ledger in this manner, the distributed ledger host platform 102 may achieve the technical benefits of blockchain (e.g., an immutable ledger, timescale lineage, access controls based on encryption, and/or other benefits) without causing a delay in the generation of data lineage. Accordingly, data lineage may reflect a current state of data in the blockchains in a substantially instantaneous method.

In some instances, in generating the data lineage as described above, the distributed ledger host platform 102 may provide access levels/permissions for the data lineage of each blockchain in the hierarchical distributed ledger (e.g., defining who may access the data lineage and/or recipients of alerts/notifications for the data lineage). In some instances, these access levels may be different or the same at each level (e.g., in each blockchain) of the hierarchical distributed ledger. In doing so, the solution presented herein may reduce an amount of stakeholders, at each level of the hierarchical distributed ledger, which would otherwise have access to each blockchain.

With further reference to FIG. 2A, at step 202, the user device 103 may establish a connection with the distributed ledger host platform 102. For example, the user device 103 may establish a first wireless data connection with the distributed ledger host platform 102 to link the user device 103 to the distributed ledger host platform 102 (e.g., in preparation for sending an event processing request). In some instances, the user device 103 may identify whether or not a connection is already established with the distributed ledger host platform 102. If a connection is already established with the distributed ledger host platform 102, the user device 103 might not re-establish the connection. If a connection is not yet established with the distributed ledger host platform 102, the user device 103 may establish the first wireless data connection as described herein.

At step 203, the user device 103 may send an event processing request to the distributed ledger host platform 102. For example, the user device 103 may send a request to execute a transaction, perform a fund transfer, execute a trade, and/or otherwise process an event (which may, in some instances, be a request to access and/or otherwise modify data). In some instances, the user device 103 may send a request to process an event in a hasty or otherwise time efficient manner (e.g., to execute an electronic trade, or the like). In some instances, the user device 103 may send the event processing request to the distributed ledger host platform 102 while the first wireless data connection is established.

At step 204, the distributed ledger host platform 102 may receive the event processing request sent at step 203. For example, the distributed ledger host platform 102 may receive the event processing request via the communication interface 113 and while the first wireless data connection is established.

At step 205, the distributed ledger host platform 102 may validate the event processing request using the distributed ledger. For example, the distributed ledger host platform 102 may modify a bottom level blockchain of the hierarchical distributed ledger representative of an element corresponding to the event processing request. For example, the distributed ledger host platform 102 may identify that the blockchain 605 corresponds to the event processing request, and currently consists of a single block (e.g., block 1). In this example, the distributed ledger host platform 102 may use blockchain 605 to validate the event processing request (e.g., identify whether sufficient funds, shares, and/or other property are available, and/or otherwise validate the request). If the distributed ledger host platform 102 identifies that the event processing request is valid, it may proceed to step 206. If the distributed ledger host platform 102 identifies that the event processing request is not valid, it may proceed to step 211.

Figure 2B:
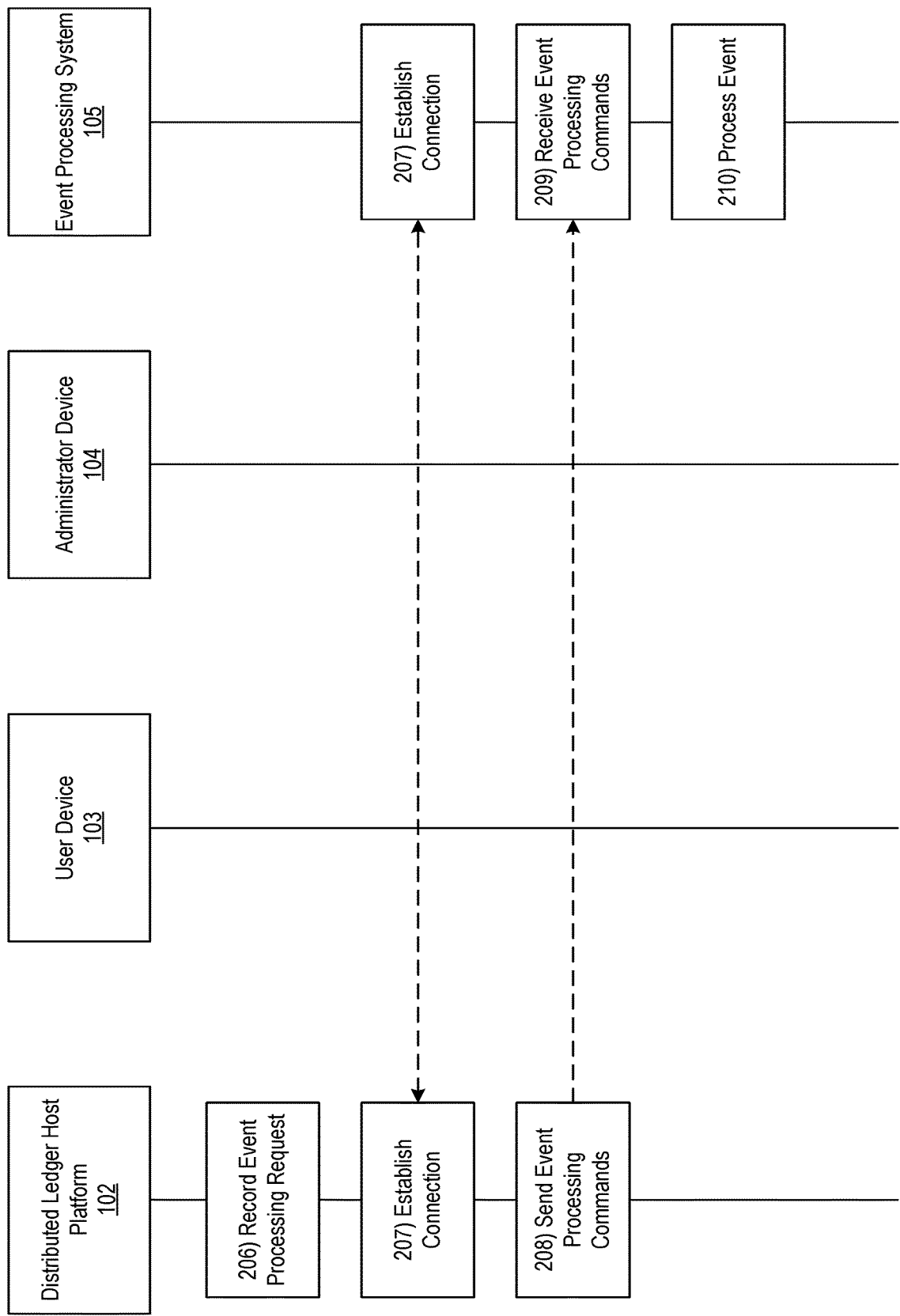

Referring to FIG. 2B, at step 206, the distributed ledger host platform 102 may record the event processing request in the hierarchical distributed ledger. For example, to continue with the example described above, the distributed ledger host platform 102 may hash chain 0 block 1 and generate block 2, which may be representative of the event processing request. In these instances, data lineage for blockchain 605 may be created/updated at the same speed that block 2 is added to blockchain 605. In some instances, the addition of block 2 to blockchain 605 may cause one or more additional blockchains in the hierarchical distributed ledger to update (e.g., if it causes a threshold number of modifications to a lower chain to be exceeded). For example, the modification to blockchain 605 may cause a threshold number of modifications to chain 0's to be exceeded, thus causing an update to blockchain 610, which may e.g., result in updates to higher level chains depending on the corresponding thresholds. As these additional blockchains are modified, the speed of data lineage for each blockchain may be the same as the speed at which data is added to the corresponding blockchain.

In some instances, recording the event processing request in the hierarchical distributed ledger may cause one or more blockchains in the hierarchical ledger to split. For example, a share represented by block 1 of chain 0 may be split, thus resulting in two separate shares. Additionally or alternatively a loan may be partially paid, thus resulting in two separate data elements. In these instances, the distributed ledger host platform 102 may generate a pair of block 2's, each tied back to block 1, and each may have subsequent blocks stemming from them. In some instances, such a split may cause one or more blockchains, higher in the hierarchical distributed ledger, to split in a similar manner and/or otherwise indicate the split.

At step 207, the distributed ledger host platform 102 may establish a connection with the event processing system 105. For example, the distributed ledger host platform 102 may establish a second wireless data connection with the event processing system 105 to link the distributed ledger host platform 102 to the event processing system 105 (e.g., in preparation for sending event processing commands). In some instances, the distributed ledger host platform 102 may identify whether or not a connection is already established with the event processing system 105. If a connection is already established with the event processing system 105, the distributed ledger host platform 102 might not re-establish the connection. If a connection is not yet established with the event processing system 105, the distributed ledger host platform 102 may establish the second wireless data connection as described herein.

At step 208, based on validation of the event processing request, the distributed ledger host platform 102 may generate and send one or more commands directing the event processing system 105 to process the event corresponding to the event processing request. For example, the distributed ledger host platform 102 may send the one or more event processing commands to the event processing system 105 via the communication interface 113 and while the second wireless data connection is established.

At step 209, the event processing system 105 may receive the event processing commands sent at step 208. For example, the event processing system 105 may receive the event processing commands while the second wireless data connection is established.

At step 210, based on or in response to the event processing commands, the event processing system 105 may process the event. For example, the event processing system 105 may execute an electronic trade, fund transfer, payment, and/or other event. After processing the event, the event sequence may proceed to step 215.

Referring to FIG. 2C, at step 211, the distributed ledger host platform 102 may establish a connection with the administrator device 104. For example, the distributed ledger host platform 102 may establish a third wireless data connection with the administrator device 104 to link the distributed ledger host platform 102 to the administrator device 104 (e.g., in preparation for sending failed transaction information). In some instances, the distributed ledger host platform 102 may identify whether or not a connection is established with the administrator device 104. If a connection is already established with the administrator device 104, the distributed ledger host platform 102 might not re-establish the connection. If a connection is not yet established with the administrator device 104, the distributed ledger host platform 102 may establish the third wireless data connection as described herein.

At step 212, based on identifying that the event processing request is not validated, the distributed ledger host platform 102 may generate and send failed transaction information to the administrator device 104 (e.g., indicated that the requested event was unable to be processed). For example, the distributed ledger host platform 102 may send the failed transaction information to the administrator device 104 via the communication interface 113 and while the third wireless data connection is established. In some instances, the distributed ledger host platform 102 may also send one or more commands directing the administrator device 104 to display the failed transaction information.

At step 213, the administrator device 104 may receive the failed transaction information. For example, the administrator device 104 may receive the failed transaction information while the third wireless data connection is established. In some instances, the administrator device 104 may also receive the one or more commands directing the administrator device 104 to display the failed transaction information.

At step 214, based on or in response to the one or more commands directing the administrator device 104 to display the failed transaction information, the administrator device 104 may display the failed transaction information. For example, the administrator device 104 may display a graphical user interface similar to graphical user interface 405, which is shown in FIG. 4, and that indicates that the requested event was unable to be processed. In some instances, steps 212-214 may additionally or alternatively be performed between the distributed ledger host platform 102 and the user device 103 (e.g., to notify an individual that their transaction was unable to be processed).

At step 215, the administrator device 104 may send a data lineage request to the distributed ledger host platform 102 (e.g., requesting information indicate how particular data has been accessed, updated, and/or otherwise modified throughout time). For example, the data lineage request may be part of an audit and/or other compliance review. In some instances, the administrator device 104 may send the data lineage request to the distributed ledger host platform 102 while the third wireless data connection is established.

At step 216, the distributed ledger host platform 102 may receive the data lineage request sent at step 215. For example, the distributed ledger host platform 102 may receive the data lineage request via the communication interface 113 and while the third wireless data connection is established.

Referring to FIG. 2D, at step 217, the distributed ledger host platform 102 may identify data lineage for the requested data. For example, the distributed ledger host platform 102 may identify one or more blockchains in the hierarchical distributed ledger that include the requested data, and may identify the data lineage for these blockchains.

At step 218, the distributed ledger host platform 102 may send data lineage information to the administrator device 104. For example, the distributed ledger host platform 102 may send data lineage information via the communication interface 113 and while the third wireless data connection is established. In some instances, the distributed ledger host platform 102 may also send one or more commands directing the administrator device 104 to display the data lineage information.

At step 219, the administrator device 104 may receive the data lineage information. For example, the administrator device 104 may receive the data lineage information while the third wireless data connection is established. In some instances, the administrator device 104 may also receive the one or more commands directing the administrator device 104 to display the data lineage information.

At step 220, based on or in response to the one or more commands directing the administrator device 104 to display the data lineage information, the administrator device 104 may display the data lineage information. For example, the administrator device 104 may display a graphical user interface similar to graphical user interface 505, which is illustrated in FIG. 5. For example, the administrator device 104 may display origin information, movement information, characteristic information, quality information, and/or other information.

Figure 3:
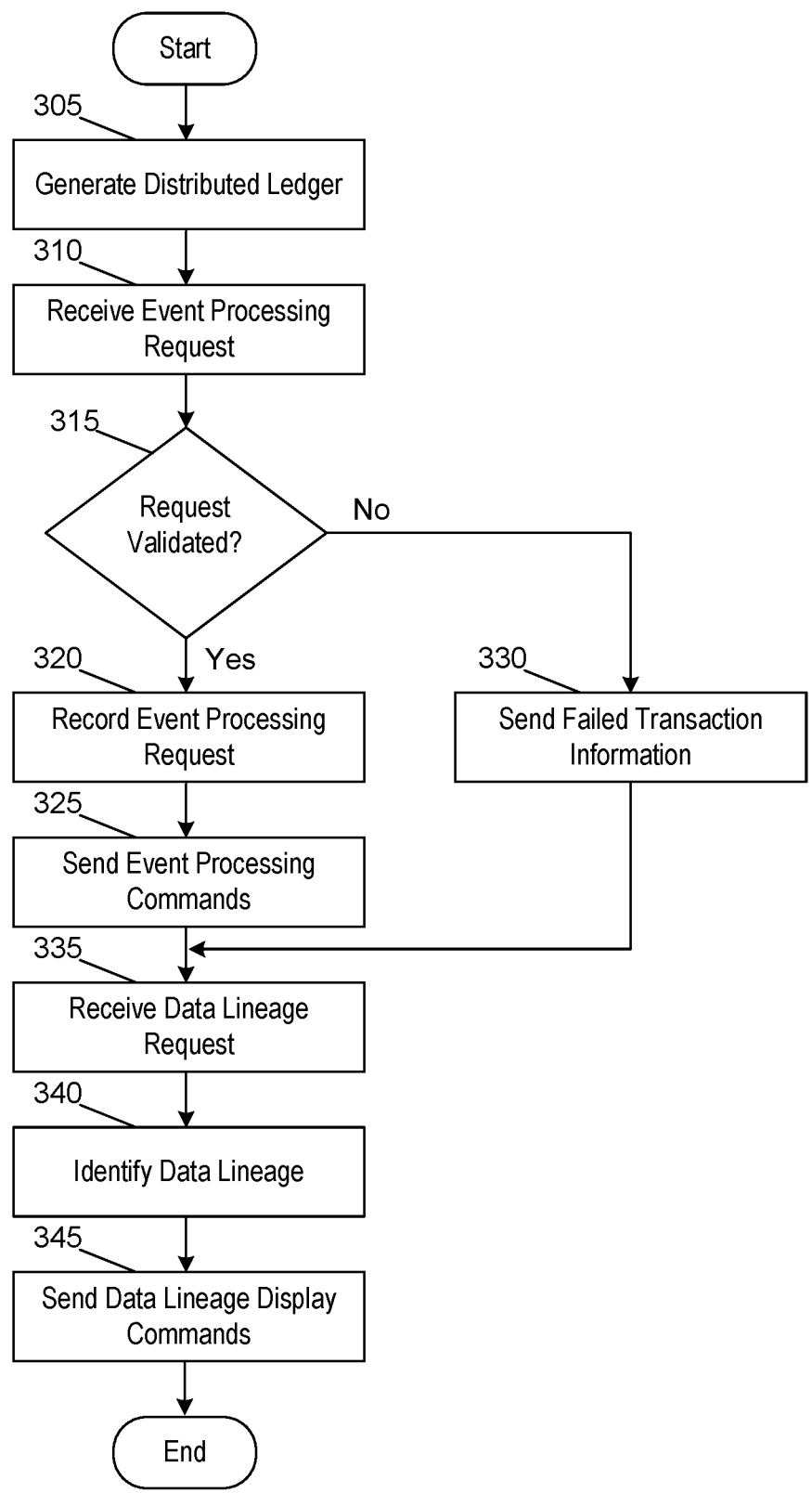
FIG. 3 depicts an illustrative method for implementing a hierarchic blockchain for data lineage in accordance with one or more example embodiments.

FIG. 3 depicts an illustrative method for implementing a hierarchic blockchain for data lineage in accordance with one or more example embodiments. Referring to FIG. 3, at step 305, a computing platform having at least one processor, a communication interface, and memory may generate a hierarchical distributed ledger. At step 310, the computing platform may receive an event processing request. At step 315, the computing platform may identify whether or not the event processing request is validated. If the event processing request is validated, the computing platform may proceed to step 320. At step 320, the computing platform may record the event processing request. At step 325, the computing platform may send one or more commands directing an event processing system to process the event.

Returning to step 315, if the event processing request is not validated, the computing platform may proceed to step 330. At step 330, the computing platform may send failed transaction information to an administrative user device. At step 335, the computing platform may receive a data lineage request. At step 340, the computing platform may identify the requested data lineage. At step 345, the computing platform may send one or more commands directing the administrative user device to display the data lineage.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   generate a distributed ledger, wherein generating the distributed ledger comprises generating a plurality of hierarchic element chains, wherein generating the plurality of hierarchic element chains comprises:
      generating one or more first hierarchic element chains, each corresponding to a data element in a data table, and
      generating one or more second hierarchic element chains, each corresponding to one or more of: a row or a column of the data table, and wherein:
         data lineage is generated, for each element of each hierarchic element chain at a speed that matches a speed of data entry to the corresponding hierarchic element chain, and
         at least a first hierarchic element chain is configured to operate at a first speed and at least a second hierarchic element chain is configured to operate at a second speed, slower than the first speed, wherein the first speed corresponds to a first amount of time to perform data entry to the first hierarchic element chain and the second speed corresponds to a second amount of time to perform data entry to the second hierarchic element chain, wherein the first amount of time is less than the second amount of time;
   receive a request to access the data lineage;
   send one or more commands directing a computing device to display the data lineage, wherein sending the one or more commands directing the computing device to display the data lineage causes the computing device to display the data lineage; and
   update a second hierarchic element chain of the one or more second hierarchic element chains, wherein updating the second hierarchic element chains comprises:
      identifying a number of modifications to the one or more first hierarchic element chains,
      comparing the number of modifications to a modification threshold,
      identifying that the number of modifications exceeds the modification threshold, and
      based on identifying that the number of modifications exceeds the modification threshold:
         hashing a first block of the second hierarchic element chain, and
         adding a second block to the second hierarchic element chain that includes the hash of the first block and indicates the modifications.

2. The computing platform of claim 1, wherein generating the plurality of hierarchic element chains further comprises:
   generating one or more third hierarchic element chains, each corresponding to the data table;
   generating one or more fourth hierarchic element chains, each corresponding to a database that includes one or more tables, wherein the one more tables includes the data table; and
   generating one or more fifth hierarchic element chains, each corresponding to a database set that includes one or more databases including the database.

3. The computing platform of claim 2, wherein generating the one or more second hierarchic element chains comprises generating a first block representative of the one or more first hierarchic element chains.

4. The computing platform of claim 2, wherein the memory stores additional computer-readable instructions that, when executed by the at least one processor, cause the computing platform to:
   update the second hierarchic element chain, wherein updating the one or more second hierarchic element chains comprises:
      identifying an amount of time that has elapsed since creation of a current block of the second hierarchic element chain,
      comparing the amount of time to a modification threshold,
      identifying that the amount of time exceeds the modification threshold,
      based on identifying that the amount of time exceeds the modification threshold:
         hashing the current block of the second hierarchic element chain, and
         adding a second block to the second hierarchic element chain that includes the hash of the current block and indicates modifications to the one or more first hierarchic element chains.

5. The computing platform of claim 1, wherein access permissions for each level of the hierarchic element chains are different.

6. The computing platform of claim 1, wherein the memory stores additional computer-readable instructions that, when executed by the at least one processor, cause the computing platform to:
   identify that the second speed is slower than the speed of data entry in the second hierarchic element chain; and
   based on identifying that the second speed is slower than the speed of data entry in the second hierarchic element chain, insert a hierarchic element chain between the first hierarchic element chain and the second hierarchic element chain, wherein adding the hierarchic element chain causes the second speed to reduce to the speed of data entry in the second hierarchic element chain.

7. The computing platform of claim 1, wherein the memory stores additional computer-readable instructions that, when executed by the at least one processor, cause the computing platform to:
   identify that the second speed is slower than the speed of data entry in the second hierarchic element chain; and
   based on identifying that the second speed is slower than the speed of data entry in the second hierarchic element chain, remove a hierarchic element chain from between the first hierarchic element chain and the second hierarchic element chain, wherein removing the hierarchic element chain causes the second speed to increase to the speed of data entry in the second hierarchic element chain.

8. The computing platform of claim 1, wherein the memory stores additional computer-readable instructions that, when executed by the at least one processor, cause the computing platform to:
  identify multiple data lineage paths for a current element of the first hierarchic element chain; and
  generate, based on identifying the multiple data lineage paths, a fork in the first hierarchic element chain, resulting in two current elements for the first hierarchic element chain.

9. A method comprising
at a computing platform comprising at least one processor, a communication interface, and memory:
  generating a distributed ledger, wherein generating the distributed ledger comprises generating a plurality of hierarchic element chains, wherein generating the plurality of hierarchic element chains comprises:
    generating one or more first hierarchic element chains, each corresponding to a data element in a data table, and
    generating one or more second hierarchic element chains, each corresponding to one or more of: a row or a column of the data table, and wherein:
      data lineage is generated, for each element of each hierarchic element chain at a speed that matches a speed of data entry to the corresponding hierarchic element chain, and
      at least a first hierarchic element chain is configured to operate at a first speed and at least a second hierarchic element chain is configured to operate at a second speed, slower than the first speed;
  receiving a request to access the data lineage;
  sending one or more commands directing a computing device to display the data lineage, wherein sending the one or more commands directing the computing device to display the data lineage causes the computing device to display the data lineage; and
  updating a second hierarchic element chain of the one or more second hierarchic element chains, wherein updating the second hierarchic element chains comprises:
    identifying a number of modifications to the one or more first hierarchic element chains,
    comparing the number of modifications to a modification threshold,
    identifying that the number of modifications exceeds the modification threshold, and
    based on identifying that the number of modifications exceeds the modification threshold:
      hashing a first block of the second hierarchic element chain, and
      adding a second block to the second hierarchic element chain that includes the hash of the first block and indicates the modifications.

10. The method of claim 9, wherein generating the plurality of hierarchic element chains further comprises:
  generating one or more third hierarchic element chains, each corresponding to the data table;
  generating one or more fourth hierarchic element chains, each corresponding to a database that includes one or more tables, wherein the one more tables includes the data table; and
  generating one or more fifth hierarchic element chains, each corresponding to a database set that includes one or more databases including the database.

11. The method of claim 10, wherein generating the one or more second hierarchic element chains comprises generating a first block representative of the one or more first hierarchic element chains.

12. The method of claim 10, further comprising:
  update the second hierarchic element chain, wherein updating the one or more second hierarchic element chains comprises:
    identifying an amount of time that has elapsed since creation of a current block of the second hierarchic element chain,
    comparing the amount of time to a modification threshold,
    identifying that the amount of time exceeds the modification threshold,
    based on identifying that the amount of time exceeds the modification threshold:
      hashing the current block of the second hierarchic element chain, and
      adding a second block to the second hierarchic element chain that includes the hash of the current block and indicates modifications to the one or more first hierarchic element chains.

13. The method of claim 9, wherein access permissions for each level of the hierarchic element chains are different.

14. The method of claim 9, further comprising:
  identifying that the second speed is slower than the speed of data entry in the second hierarchic element chain; and
  based on identifying that the second speed is slower than the speed of data entry in the second hierarchic element chain, inserting a hierarchic element chain between the first hierarchic element chain and the second hierarchic element chain, wherein adding the hierarchic element chain causes the second speed to reduce to the speed of data entry in the second hierarchic element chain.

15. The method of claim 9, further comprising:
  identifying that the second speed is slower than the speed of data entry in the second hierarchic element chain; and
  based on identifying that the second speed is slower than the speed of data entry in the second hierarchic element chain, removing a hierarchic element chain from between the first hierarchic element chain and the second hierarchic element chain, wherein removing the hierarchic element chain causes the second speed to increase to the speed of data entry in the second hierarchic element chain.

16. The method of claim 9, further comprising:
  identifying multiple data lineage paths for a current element of the first hierarchic element chain; and
  generating, based on identifying the multiple data lineage paths, a fork in the first hierarchic element chain, resulting in two current elements for the first hierarchic element chain.

17. One or more non-transitory computer-readable media storing instructions that, when executed by a computing platform comprising at least one processor, a communication interface, and memory, cause the computing platform to:
  generate a distributed ledger, wherein generating the distributed ledger comprises generating a plurality of hierarchic element chains, wherein generating the plurality of hierarchic element chains comprises:
    generating one or more first hierarchic element chains, each corresponding to a data element in a data table, and generating one or more second hierarchic element chains, each corresponding to one or more of: a row or a column of the data table, and wherein:
  data lineage is generated, for each element of each hierarchic element chain at a speed that matches a speed of data entry to the corresponding hierarchic element chain, and
  at least a first hierarchic element chain is configured to operate at a first speed and at least a second hierarchic element chain is configured to operate at a second speed, slower than the first speed;
receive a request to access the data lineage;
send one or more commands directing a computing device to display the data lineage, wherein sending the one or more commands directing the computing device to display the data lineage causes the computing device to display the data lineage; and
update a second hierarchic element chain of the one or more second hierarchic element chains, wherein updating the second hierarchic element chains comprises:
  identifying a number of modifications to the one or more first hierarchic element chains,
  comparing the number of modifications to a modification threshold,
  identifying that the number of modifications exceeds the modification threshold, and
  based on identifying that the number of modifications exceeds the modification threshold:
    hashing a first block of the second hierarchic element chain, and
    adding a second block to the second hierarchic element chain that includes the hash of the first block and indicates the modifications.

18. The one or more non-transitory computer-readable media of claim 17, wherein generating the plurality of hierarchic element chains further comprises:
  generating one or more third hierarchic element chains, each corresponding to the data table;
  generating one or more fourth hierarchic element chains, each corresponding to a database that includes one or more tables, wherein the one more tables includes the data table; and
  generating one or more fifth hierarchic element chains, each corresponding to a database set that includes one or more databases including the database.

\* \* \* \* \*

UNITED STATES PATENT AND TRADEMARK OFFICE
CERTIFICATE OF CORRECTION

PATENT NO. : 11,797,574 B2  
APPLICATION NO. : 17/389739  
DATED : October 24, 2023  
INVENTOR(S) : Albero et al.

Page 1 of 1

It is certified that error appears in the above-identified patent and that said Letters Patent is hereby corrected as shown below:

In the Claims

Column 15, Claim 9, Line 11:
After "comprising", insert --:--

Signed and Sealed this
Twenty-sixth Day of November, 2024

Katherine Kelly Vidal
*Director of the United States Patent and Trademark Office*